United States Patent
Honda (10) Patent No.: US 8,214,714 B2
(45) Date of Patent: Jul. 3, 2012

(54) NONVOLATILE STORAGE DEVICE, CONTROLLER OF NONVOLATILE MEMORY, AND NONVOLATILE STORAGE SYSTEM

(75) Inventor: Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 1320 days.

(21) Appl. No.: 11/909,311

(22) PCT Filed: Mar. 22, 2006

(86) PCT No.: PCT/JP2006/305699
§ 371 (c)(1),
(2), (4) Date: Sep. 21, 2007

(87) PCT Pub. No.: WO2006/101123
PCT Pub. Date: Sep. 28, 2006

(65) Prior Publication Data
US 2009/0077445 A1    Mar. 19, 2009

(30) Foreign Application Priority Data
Mar. 23, 2005  (JP) .................. 2005-083072

(51) Int. Cl.
G06F 13/00 (2006.01)
H03M 13/00 (2006.01)

(52) U.S. Cl. .................. 714/752; 711/154

(58) Field of Classification Search .......... 714/752, 714/758, 718; 711/103, 154
See application file for complete search history.

(56) References Cited

U.S. PATENT DOCUMENTS

| | | | |
|---|---|---|---|
| 4,443,865 A * | 4/1984 | Schultz et al. ......... | 712/242 |
| 7,114,659 B2 | 10/2006 | Harari et al. | |
| 7,809,878 B2 * | 10/2010 | Yoo et al. ............... | 711/103 |
| 2001/0032290 A1 * | 10/2001 | Williams ............... | 711/104 |
| 2003/0084233 A1 * | 5/2003 | Williams ............... | 711/105 |
| 2004/0030830 A1 | 2/2004 | Shimizu | |
| 2004/0089717 A1 | 5/2004 | Harari et al. | |
| 2007/0214309 A1 | 9/2007 | Matsuura et al. | |

FOREIGN PATENT DOCUMENTS

| | | |
|---|---|---|
| JP | 200082122 | 3/2000 |
| JP | 2004234129 | 8/2004 |
| WO | 02069127 | 9/2002 |
| WO | 2007044755 | 5/2004 |

OTHER PUBLICATIONS

Lin, C.-S.; Dung, L.-R.;, "A NAND Flash Memory Controller for SD/MMC Flash Memory Card," Magnetics, IEEE Transactions on, vol. 43, No. 2, pp. 933-935, Feb. 2007 doi: 10.1109/TMAG.2006.888520.*

(Continued)

Primary Examiner — Cynthia Britt
(74) Attorney, Agent, or Firm — Greenblum & Bernstein, P.L.C.

(57) ABSTRACT

A nonvolatile storage device includes a nonvolatile memory for storing data such as a flash memory, and a controller for controlling writing or reading of data to or from the nonvolatile memory. The nonvolatile memory stores control information (control program, control parameter) specifying a method of controlling writing or reading of data to or from the nonvolatile memory. The controller determines a type of the nonvolatile memory, and acquires the control information from the nonvolatile memory according to an acquisition procedure corresponding to the type of the nonvolatile memory, and stores (loads) the control information.

19 Claims, 8 Drawing Sheets

OTHER PUBLICATIONS

Curran, B. W.; Walz, M. H.;, "IBM Enterprise System/9000 Type 9121 system controller and memory subsystem design," IBM Journal of Research and Development, vol. 35, No. 3, pp. 357-366, May 1991 doi: 10.1147/rd.353.0357.*

Chuan-Sheng Lin; Kuang-Yuan Chen; Yu-Hsian Wang; Lan-Rong Dung;, "A NAND Flash Memory Controller for SD/MMC Flash Memory Card," Electronics, Circuits and Systems, 2006. ICECS '06. 13th IEEE International Conference on, vol., No., pp. 1284-1287, Dec. 10-13, 2006 doi: 10.1109/ICECS.2006.379716.*

English Language Abstract of JP 2004-234129.

English Language Abstract of JP 2000-82122.

U.S. Appl. No. 11/912,700 to Honda et al., which was filed on Oct. 26, 2007.

U.S. Appl. No. 11/993,631 to Inoue et al., which was filed on Dec. 21, 2007.

* cited by examiner

NONVOLATILE STORAGE DEVICE, CONTROLLER OF NONVOLATILE MEMORY, AND NONVOLATILE STORAGE SYSTEM

TECHNICAL FIELD

The present invention relates to a nonvolatile storage device using a nonvolatile memory and a method of loading control information (control program and the like) of the nonvolatile storage device.

BACKGROUND ART

In recent years, a memory card loaded with a nonvolatile memory like a flash memory has been expanding a market thereof as a recording medium used in a digital camera and a portable telephone. With expansion of the market of the memory card, participation of newcomer manufacturers into a market of NAND flash memory for the memory card which has been occupied by a small number of manufacturers has increased and consequently, specifications of the NAND flash memories have been diversified on detailed levels. Further, new type nonvolatile memory which is different from the NAND flash memory has been proposed. It is expected that further diversified types of the specifications of the nonvolatile memories are coexisting in a future.

A controller which controls the nonvolatile memory in the memory card and provides a generalized interface with a host unit also needs to be diversified to cope with the various specifications of the nonvolatile memories.

Patent Document 1 proposes storage of programs for a micro computer in the flash memory in order to intensify availability of a flash card by reducing a development period thereof. Consequently, correction of faults on a development stage can be carried out easily.

Patent Document 1: JP-A-2000-82122

DISCLOSURE OF INVENTION

Problem to be Solved by the Invention

To control diversified types of nonvolatile memories, data formats and architectures meeting the diversified types of nonvolatile memories need to be provided. However, the method according to Patent Document 1 cannot achieve this.

Development of such diversified controllers to cope with the diversified types of nonvolatile memories takes a lot of steps, and time required for the development is increased. From a viewpoint of management, manufacturing of the diversified controllers may increase stock thereby causing a negative factor.

The present invention has been achieved to solve the above-described problem and an object of the invention is to provide a semiconductor memory device capable of controlling with a single controller regardless of the type of the nonvolatile memory implemented.

Means for Solving the Problem

According to a first aspect of the present invention, there is provided a nonvolatile storage device including a nonvolatile memory for storing data, and a controller for controlling writing or reading of data to or from the nonvolatile memory. The nonvolatile memory stores control information which specifies a control method for writing or reading data to or from the nonvolatile memory. The controller determines a type of the nonvolatile memory, acquires the control information from the nonvolatile memory according to an acquisition procedure corresponding to the type of the nonvolatile memory, and stores the control information.

According to a second aspect of the present invention, there is provided a method of loading control information for a nonvolatile storage device having a nonvolatile memory for storing data and a controller for controlling writing or reading of data to or from the nonvolatile memory. The nonvolatile memory stores control information which specifies a control method for writing or reading of data to or from the nonvolatile memory. The loading method includes determining a type of the nonvolatile memory, acquiring the control information from the nonvolatile memory according to an acquisition procedure corresponding to the type of the nonvolatile memory, and setting the acquired control information to the controller.

Effect of the Invention

According to the present invention, since the controller acquires the control information from the nonvolatile memory and stores (loads) it, there is no necessity of changing a design of the controller correspondingly to the implemented nonvolatile memory. Further, even if the type of the loaded nonvolatile memory is different, it is possible to control with the same controller chip.

DESCRIPTION OF REFERENCE SIGNS 100, 100, 100c: memory card
102: host
103, 103b, 103c: controller
104: flash memory
105: host I/F
106: flash I/F
107, 120, 121: ROM
108: page buffer
109: ECC circuit
110: MPU 111: flash control DSP
112: IRAM

BEST MODE FOR CARRYING OUT THE
INVENTION

Embodiments of the present invention will be described below with reference to the accompanying drawings.

First Embodiment

1. Structure of Memory Card

Figure 1:
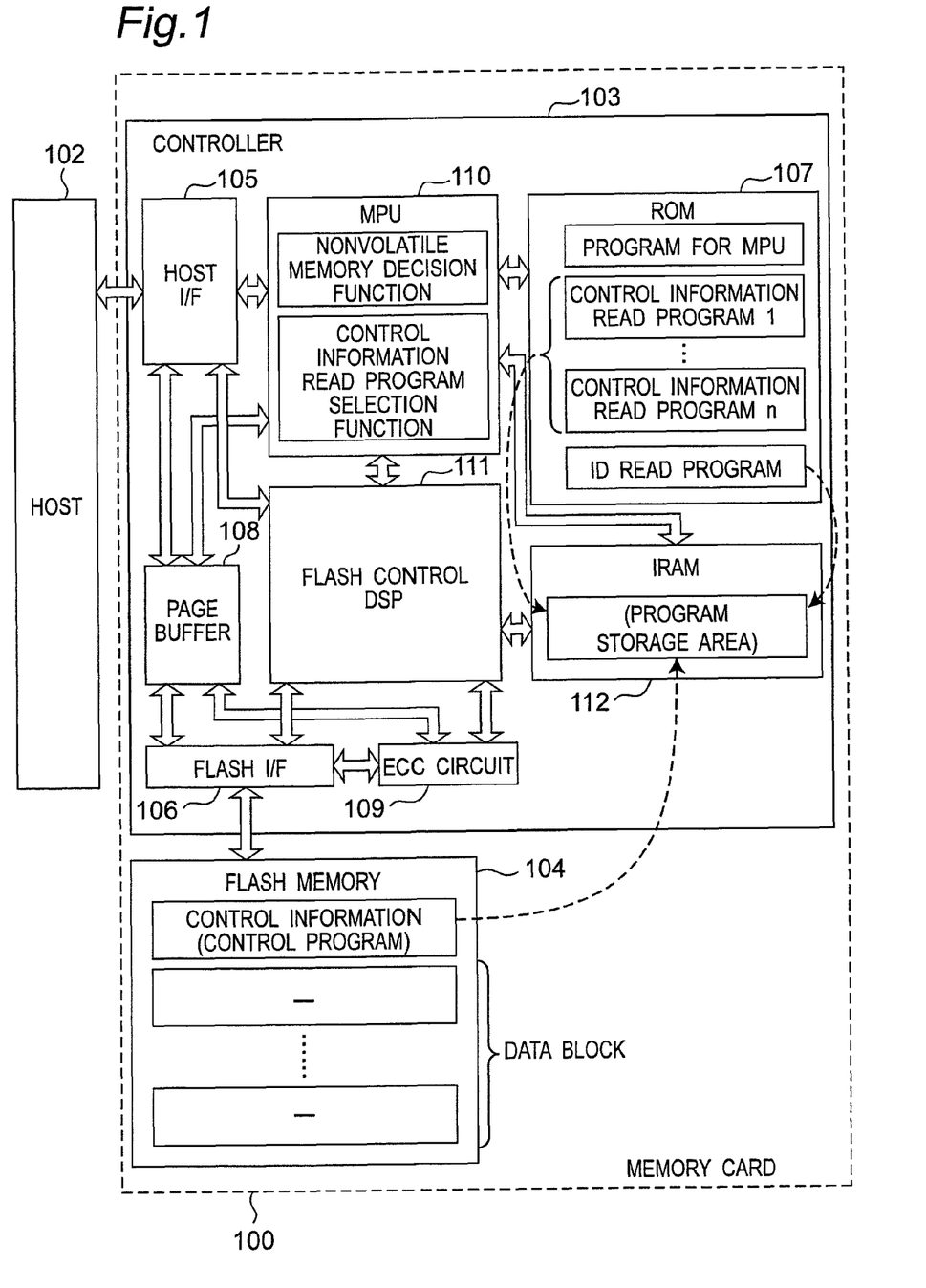
FIG. 1 is a block diagram showing a structure of a memory card (nonvolatile storage device) according to a first embodiment of the present invention.

FIG. 1 is a block diagram showing a structure of a memory card as an embodiment of a nonvolatile storage device of the present invention.

In FIG. 1, a memory card 100 is accessed by a host 102. The memory card 100 includes a controller 103 and a flash memory 104 which is controlled by the controller 103.

The flash memory 104 stores, as control information, a control program to be executed for controlling writing/reading of data to/from the flash memory 104. The flash memory 104 is exemplified as an example of a nonvolatile memory, and a nonvolatile memory to be controlled by the controller 103 is not limited to a flash memory but may be a nonvolatile memory which has different format than that of a flash memory.

The controller 103 controls an interface with the host 102 in addition to control of the flash memory 104. The controller 103 includes a host interface (host I/F) 105, a flash interface (flash I/F) 106, a ROM (Read Only Memory) 107, a page buffer 108, an ECC circuit (Error detection and correction circuit) 109, an MPU (Micro Processing Unit) 110, a flash control digital signal processing unit (flash control DSP) 111, and an IRAM (Instruction Random Access Memory) 112.

The host I/F 105 is interposed between the host 102 and the page buffer 108, controlling the interface for the host 102.

The flash I/F 106 is interposed between the flash memory 104 and the page buffer 108, controlling writing/reading of data to/from the flash memory 104.

The RCM 107 is a non-rewritable, read-only-memory with a capacity of 64 KB. The ROM 107 stores a program (program for the MPU) for operating the MPU 110 and plural control information read programs for reading the control program from the flash memory 104.

The page buffer 108 is interposed between the host I/F 105 and the flash I/F 106, and is a rewritable volatile memory for temporarily storing data to be written from the host 102 to the flash memory 104 or read data from the flash memory 104 to the host 102. A capacity thereof is the same as a capacity of data which can be written to the flash memory 104, and is 2 KB in this embodiment.

The ECC circuit 109 has an encoder function of computing an ECC code to be added to data when the data is written to the flash memory 104, a decoder function of detecting an error by calculating the data and the ECC code when reading the data from the flash memory 104. Further the ECC circuit 109 has a function of switching correction ability among plural correction abilities.

The MPU 110 realizes a predetermined function while reading an instruction of a program for the MPU in succession from the ROM 107.

The MPU 110 receives a command from the host 102 via the host I/F 105, and controls the flash control DSP 111 as required to execute the command received from the host 102. The MPU 110 has a function of determining a procedure for reading the control program from the flash memory 104 by determining a type of the flash memory 104, and a function of reading the control program from the flash memory 104 to load it into the IRAM 112.

The flash control DSP 111, while reading a program stored in the IRAM 112, controls the host I/F 105, the flash I/F 106, the page buffer 108 and the ECC circuit 109 under control of the MPU 110, and controls data writing from the host 102 to the flash memory 104 and data reading from the flash memory 104 to the host 102.

The ROM 107 stores at minimum data of several tens of words for determining the type of the flash memory 104. The data for determining the type of the flash memory 104 is identification information (ID) specific to a flash memory device, and includes, for example, a manufacturer code which indicates a manufacturer, a device code which indicates capacity of the device, and a code which indicates a memory cell configuration within the device.

The IRAM 112 is a memory for storing instruction codes for operating the flash control DSP 111, and is achieved by a rewritable volatile memory with a capacity of 2 KB. According to the present embodiment, several types of instruction codes are stored in the IRAM 112 depending on the type of the flash memory 104 which is a control object, thereby realizing a wide variety of controls for a nonvolatile memory.

2. Operation Sequence

Figure 2:
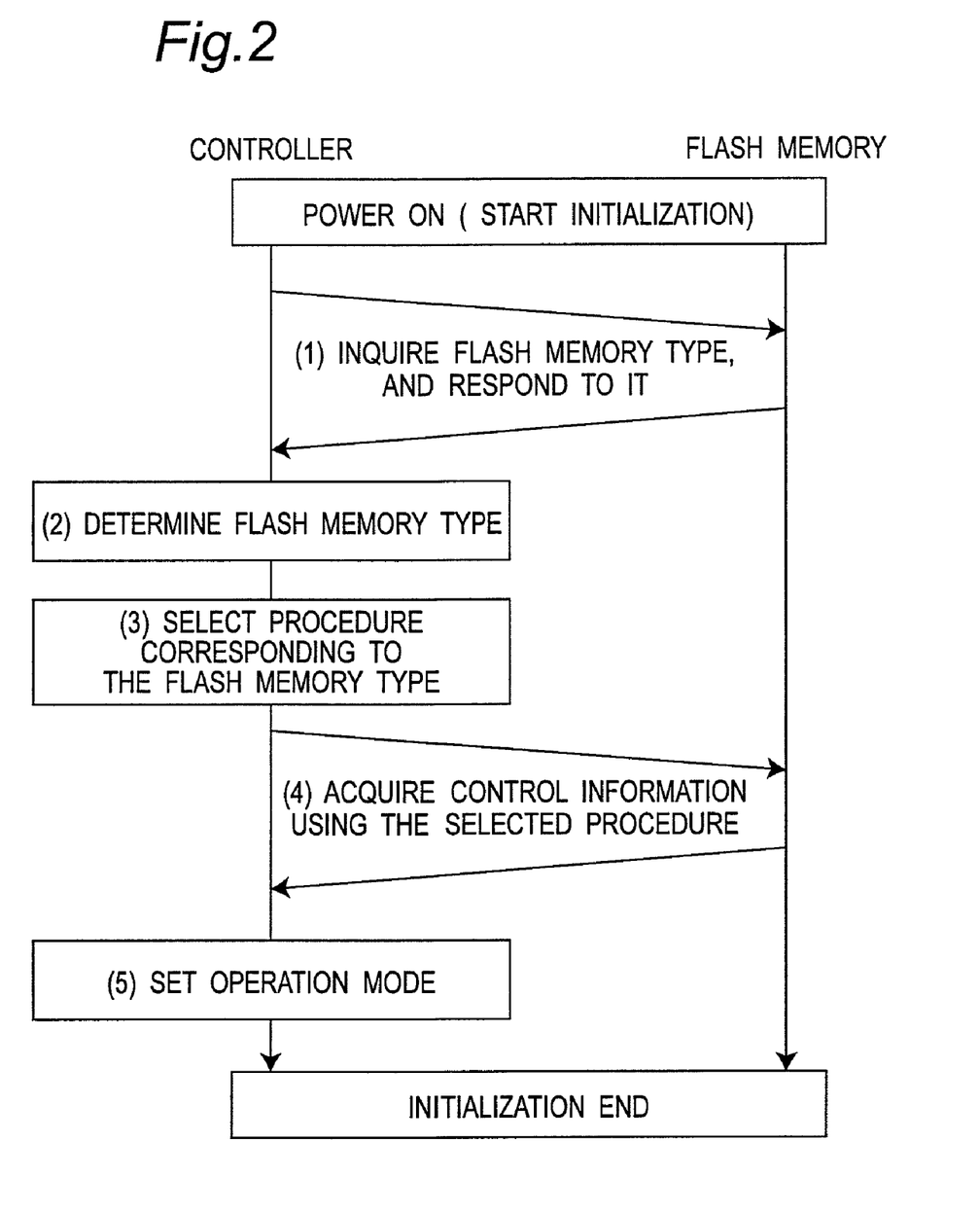
FIG. 2 is an operation sequence at a time of an initializing operation of the memory card according to the first embodiment of the present invention.

FIG. 2 is a diagram for explaining an operation sequence between the controller and the flash memory at a time of an initialization operation of the memory card (nonvolatile storage device) of the present embodiment.

(1) When the memory card is turned ON, the initializing operation is started. The controller 103 inquires of the flash memory 104 about a type of the flash memory 104. The flash memory 104 responds to this inquiry to send identification information about the type of the flash memory 104 (for example, manufacturer code indicating a manufacturer, device code indicating the capacity of the device, a code indicating a memory cell configuration in the device and the like). The reason why the type of the flash memory is inquired is to determine a data reading means which varies depending on the type of the flash memory. For example, a reading command, an address specifying method, a unit for reading, and a range and a performance of an applied ECC differ depending on the type of the flash memory.

(2) When acquiring information about the type of the flash memory 104 as a response, the controller 103 decides the type of the flash memory 104 based on the acquired information.

(3) Subsequently, the controller 103 selects a process (procedure) for acquiring control information from the flash memory 104 according to the type of the flash memory 104. The control information is information for specifying a control method for writing/reading data to/from the nonvolatile memory, and includes control programs, control parameters and the like.

(4) The control information is acquired from the flash memory 104 in accordance with the selected process (procedure).

(5) An operation mode for accessing the flash memory 104 is set using the acquired control information.

As described above, the control information suitable for the flash memory 104 is set to the controller 103 at the time of the initialization operation.

3. Flow Chart

Figure 3:
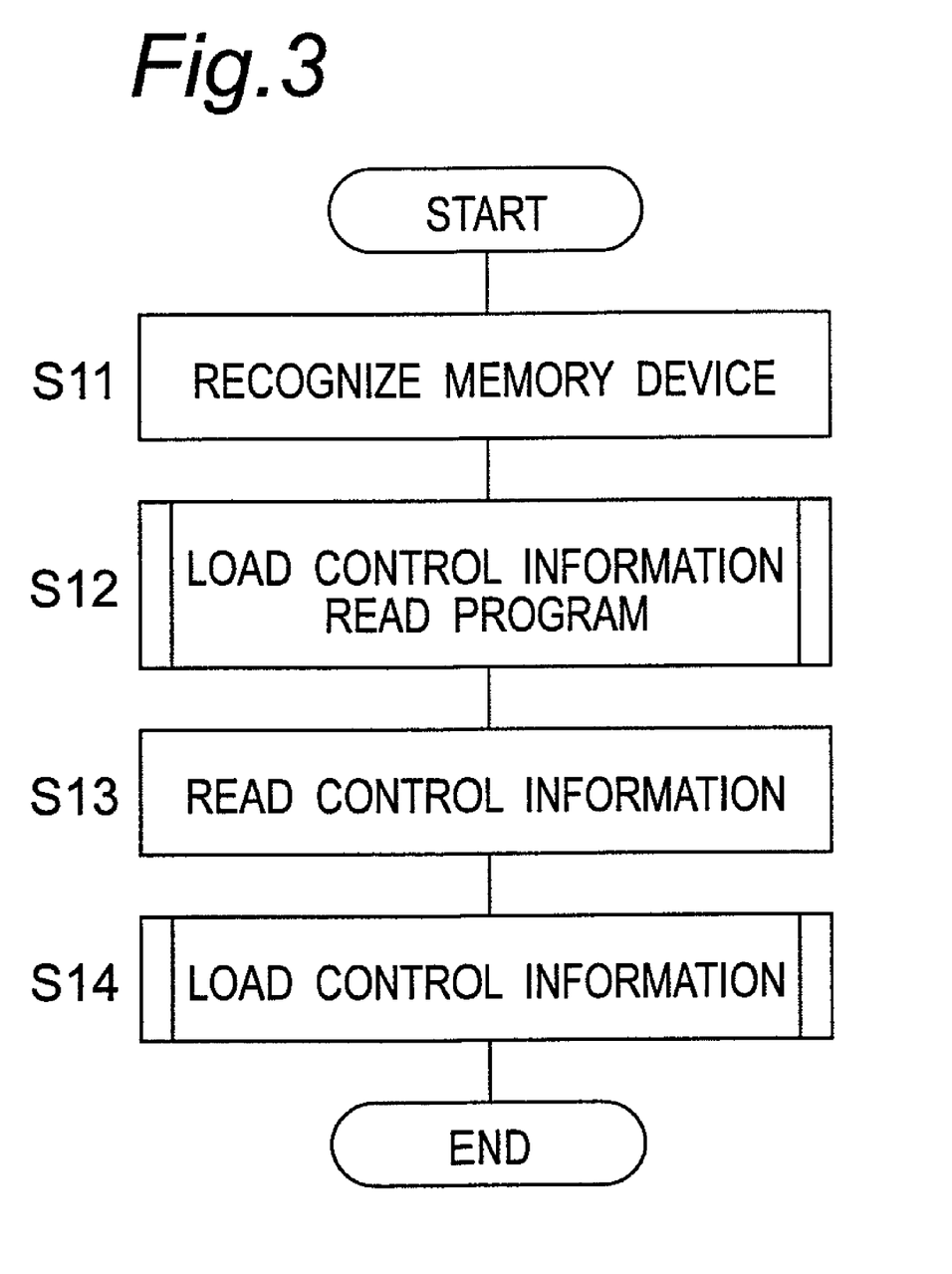
FIG. 3 is a flow chart showing a control information loading operation of the memory card according to the first embodiment of the present invention.

FIG. 3 is a flow chart showing a process of loading the control program corresponding to the nonvolatile memory to the IRAM 112 in the memory card of the first embodiment.

When the memory card 100 is connected to the host 102 and is turned ON, the MPU 110 inquires of the flash memory 104 to be connected as a nonvolatile memory about the type of the memory, that is, recognizes the device (S11). Specifically, recognition of the device is carried out by acquiring the identification information (ID) of the flash memory 104 from the flash memory 104.

Next, the MPU 110 selects a control information read program corresponding to the memory device based on the identification information to load it into the IRAM 112 (S12). Specifically, the MPU 110 selects a program corresponding to the flash memory 104 from plural control information read programs stored preliminarily in the ROM 107, based on the identification information read from the flash memory 104. Then the MPU 110 transfers the selected program to a program storage area in the IRAM 112. At this time, the MPU 110 may execute an operation corresponding to the flash memory 104 under control of the program for the MPU.

The control information read program realizes a function of transferring data corresponding to at lest one page of the flash memory 104 to the page buffer 108, and a function for correcting an ECC which is added to data to be written into the flash memory 104. The control information read program is a program unique to the flash memory 104, which is determined by a format of data including allocation of the ECC code written into the flash memory 104.

Because a wide variety of nonvolatile memories which can be loaded into the memory card 100 have different values for reliability such as data holding ability, the ECC code having an appropriate ability corresponding to the nonvolatile memory is added to data and the data is written. Thus, upon reading, it is also necessary to read according to the ability of the added ECC code. In step S12, when the MPU 110 loads the control information read program appropriate for the flash memory 104 into the IRAM 112, data writing or reading corresponding to the correction ability of the ECC code which the flash memory 104 needs can be executed by the flash control DSP 111.

Next, the control program is read out according to the control information read program loaded into the IRAM 112 (S13). Specifically, the MPU 110 controls the flash control DSP 111 so as to read the control program from the flash memory 104. That is, the flash control DSP 111 uses the control information read program which is loaded into the IRAM 112 as an instruction code to read the control program from the flash memory 104, and transfers the read control program to the page buffer 108.

When a correctable error is found upon reading this control program, the flash control DSP 111 corrects the error of the data in the page buffer 108 using the control information read program.

The control program is a program customized to meet features of various flash memories, including a program for making the flash control DSP 111 control the flash memory 104.

Finally, the read out control program is loaded into the IRAM 112 (S14). Specifically, the MPU 110 transfers the control program which is read to the page buffer 108 to the program storage area of the IRAM 112. Thus, the flash memory DSP 111 can control the flash memory 104 according to the control program loaded in the IRAM 112.

As described above, according to this embodiment, a memory device is firstly recognized, and then a control information read program corresponding to the memory device is selected. Based on the selected control information read program, a control program corresponding to the flash memory 104 is read from the flash memory 104 and it is loaded into the IRAM 112. In this way, the controller 103 can set an operation mode corresponding to the type of the flash memory 104.

The control program which can be stored in the flash memory 104 can be arbitrarily set to each of a wide variety of nonvolatile memories which would be connected to the controller 103. Thus, the controller 103 may be allowed to operate correspondingly to a wide variety of nonvolatile memories without changing a specification thereof.

4. Conclusion

According to the memory card of this embodiment, the controller reads and uses information (control program) necessary for control of the nonvolatile memory (flash memory) from the nonvolatile memory according to a method suitable for the nonvolatile memory. That is, even if the nonvolatile storage device could include different types of nonvolatile memories, control of the nonvolatile memory can be carried out by one controller. Thus it does not need to develop a wide variety of controllers each corresponding to each of a wide variety of nonvolatile memories, thereby reducing cost for design and manufacturing of the nonvolatile storage device.

Second Embodiment

Another embodiment of the present invention will be described. The memory card of this embodiment has a structure shown in FIG. 1 and an operation sequence thereof is similar to the one shown in FIG. 2.

A process of loading a control program corresponding to the flash memory to the controller in the memory card of this embodiment will be described with reference to FIG. 4.

When the memory card 100 is turned ON, the MPU 110 loads an ID read program which is stored in the RCM 107 into the IRAM 112 (S21). The flash control DSP 111 inquires of the flash memory 104 about identification information (ID) specific to the flash memory 104 according to a predetermined inquiry procedure in accordance with an ID read program stored in the IRAM 112 (S22). The MPU 110 has plural inquiry procedures and each of the inquiry procedures can be tried in succession as required.

The flash memory 104 returns the identification information to the flash control DSP 111. The MPU 110 acquires the identification information of the flash memory 104 via the flash control DSP 111. Based on the acquired identification information, the MPU 110 determines whether or not the flash memory 104 connected to the controller 103 is a memory which can be processed by the controller 103 (S23). Specifically, the MPU 110 matches the identification information acquired from the flash memory 104 against the identification information stored in the RCM 107. If there is any matching information, it is determined that the flash memory 104 is a memory which can be processed by the controller 103.

When it is determined that the flash memory 104 connected to the controller 103 is a memory which can be processed by the controller 103, a control information acquisition process is carried out (S24). Otherwise, it is determined whether or not there is any inquiry procedure not tried (S25). If there is any, in a next inquiry procedure, the identification information (ID) is inquired again (S22).

When it is not determined that the flash memory 104 is a memory which can be processed by the controller 103 by using all the inquiry procedures, the process is forced to abnormally end. In this case, it is possible to indicate an "abnormal end" on the host 102.

Figure 5:
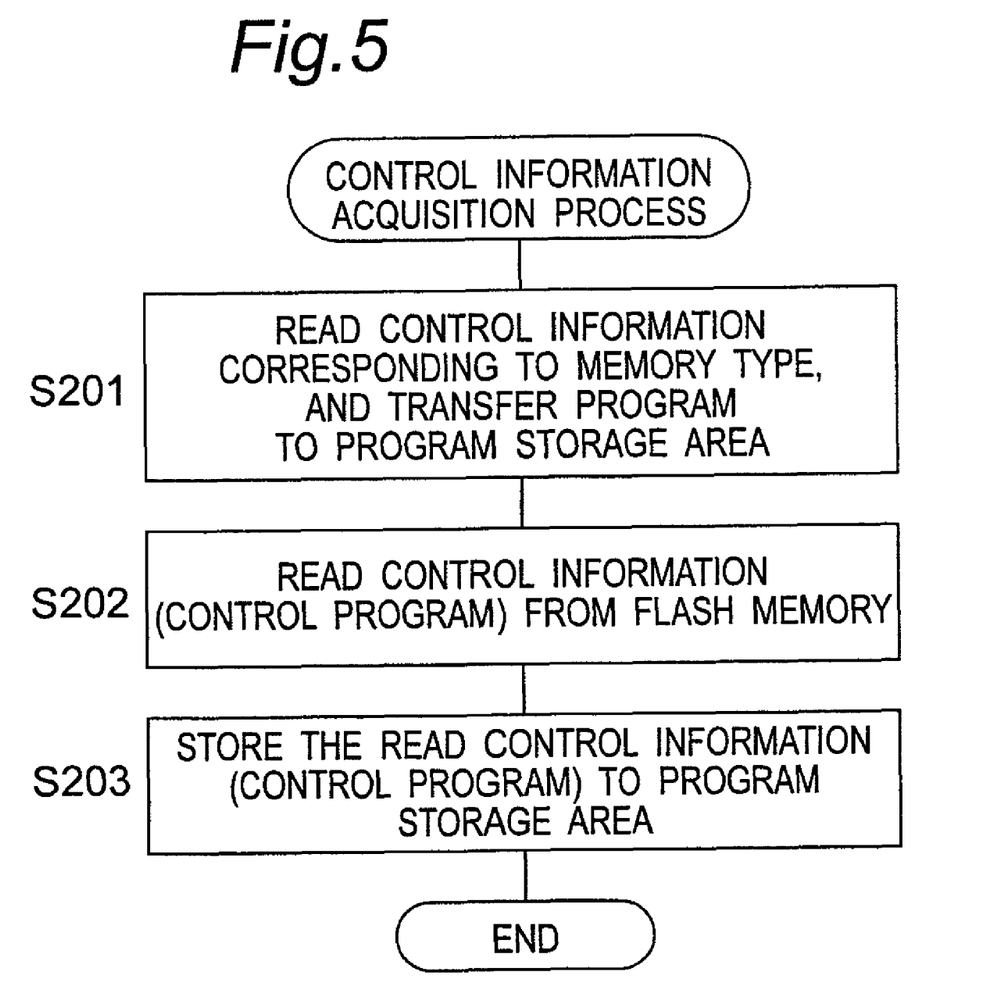
FIG. 5 is a flow chart showing a control information acquisition process of the memory card according to the second embodiment of the present invention.

Next, the control information acquisition process of the aforementioned step S24 will be described with reference to FIG. 5. When the flash memory 104 is a memory which can be processed by the controller 103, the MPU 110 selects the control information read program corresponding to the identification information (ID) from the plural control information read programs stored in the RCM 107, and transfers it to the program storage area of the IRAM 112 (S201). Next, the MPU 110 controls the flash control DSP 111 according to the control information read program stored in the IRAM 112 so as to read the control program from the flash memory 104 as the control information (S202). The read control program is stored in the program storage area of the IRAM 112 (S203).

According to this embodiment also, the control program corresponding to the specification of the flash memory 104 is set in the controller 103. Thus, even if the nonvolatile storage device could include different types of nonvolatile memories, control of the nonvolatile memory can be carried out by one controller. Therefore, it does not need to develop a controller having a different specification for every nonvolatile memory, thereby reducing cost for design and manufacturing of the nonvolatile storage device.

Third Embodiment

Figure 6:
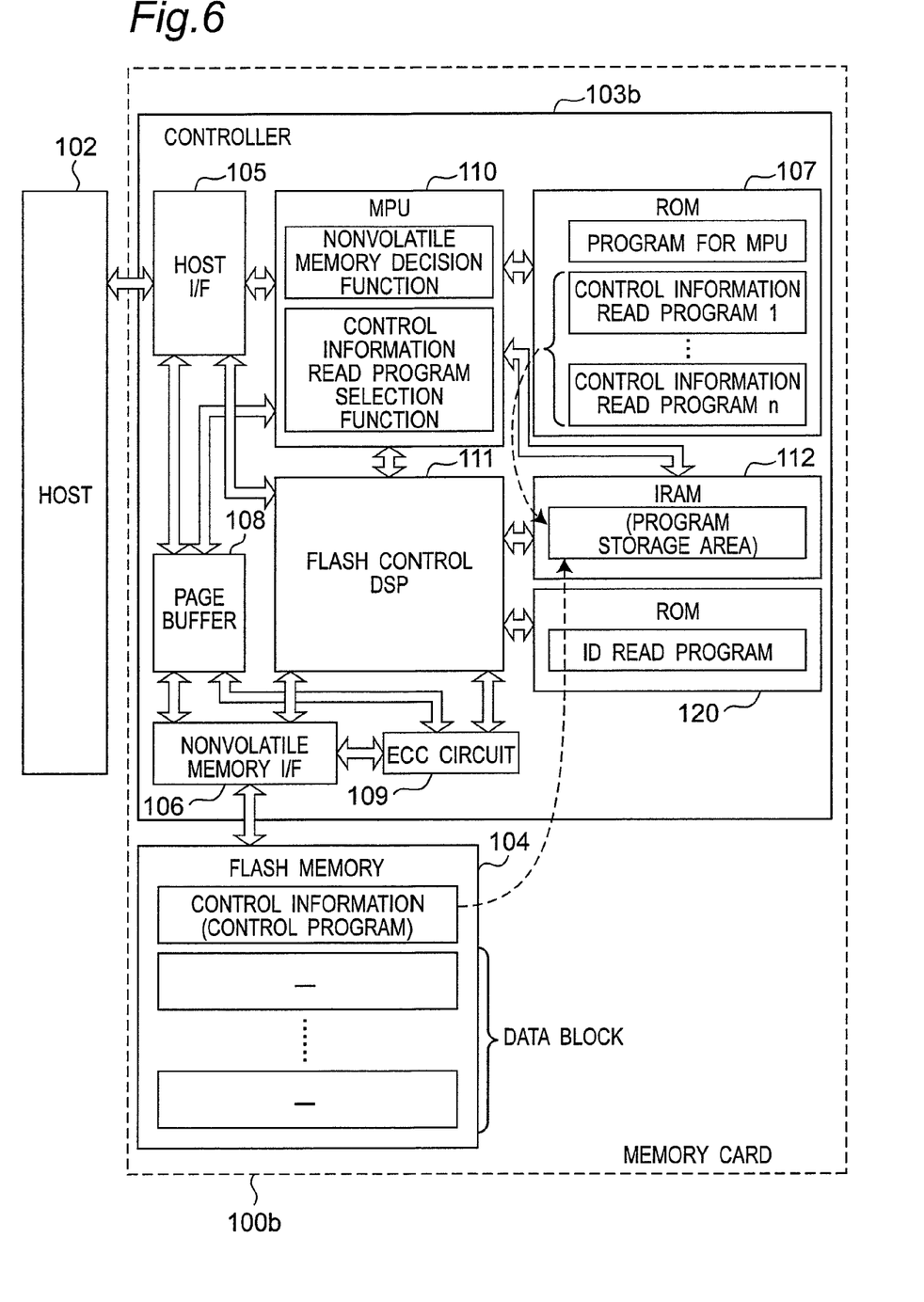
FIG. 6 is a block diagram showing the structure of the memory card (nonvolatile storage device) according to a third embodiment of the present invention.

Still another embodiment of the present invention will be described. FIG. 6 is a block diagram showing a structure of a memory card according to still another embodiment of the nonvolatile storage device of the present invention.

A memory card 100b of this embodiment further includes a RCM 120 connected to the flash control DSP 111 as well as the structure of the memory card shown in FIG. 1.

Although in the first and second embodiments, the ID read program is stored in the RCM 107 connected to the MPU 110, in this embodiment, it is stored in the ROM 120 connected to the flash control DSP 111. As described above, the memory card 100b of this embodiment is different from those of the first and second embodiments only in a location from which the ID read program is read out, and the remaining processes are the same as those shown in FIGS. 3 or 4 and 5.

According to this embodiment also, access corresponding to the specification of the flash memory 104 by the controller 103b is possible by loading the control program which is read from the flash memory 104 into the controller 103b.

Fourth Embodiment

Still another embodiment of the present invention will be described. In this embodiment, plural indispensable parameters for execution of the program are managed separately from the program. Then, a parameter corresponding to the type of the flash memory is selected from the plural parameters and the program is executed using the selected parameter, thus achieving control corresponding to the flash memory.

Figure 7:
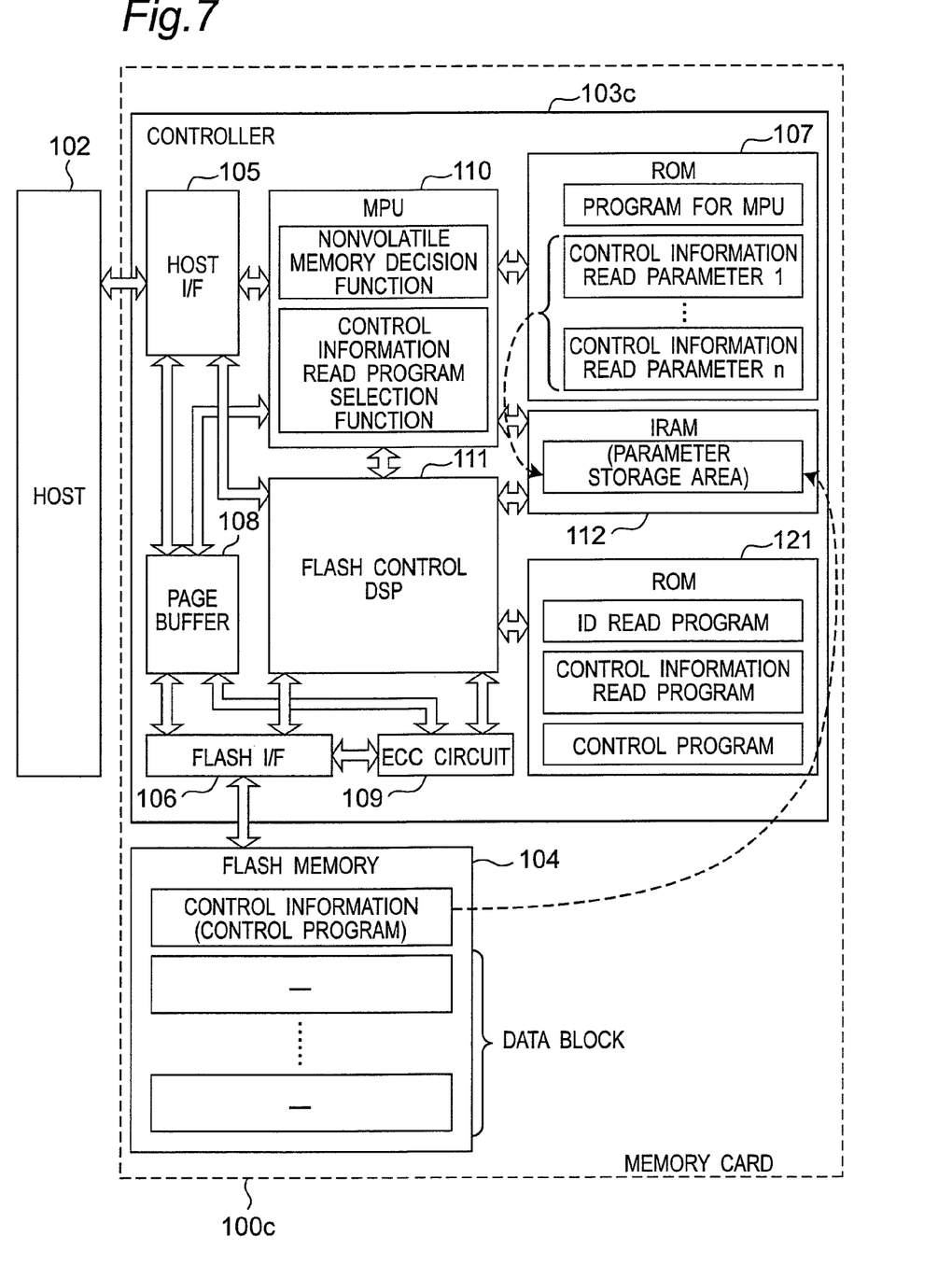
FIG. 7 is a block diagram showing the structure of the memory card (nonvolatile storage device) according to a fourth embodiment of the present invention.

FIG. 7 is a block diagram showing a structure of a memory card according to still another embodiment of the nonvolatile storage device of the present invention.

A memory card 100c of this embodiment further includes a RCM 121 connected to the flash control DSP 111 in addition to the structure of the memory card shown in FIG. 1.

According to this embodiment, the ROM 107 connected to the MPU 110 stores plural control information read parameters as well as the program for the MPU. The RCM 121 connected to the flash control DSP 111 stores the ID read program, the control information read program and the control program.

The control information read parameter is set to each type of the flash memory. By executing the control information read program using the control information read parameter, read of the control parameter corresponding to the type of the flash memory is achieved. The control program is executed with reference to the control parameter. The control parameter is stored in the flash memory 104. The control parameter is read from the flash memory 104 when the memory card is turned ON, and is used at a time of executing the control program.

Figure 4:
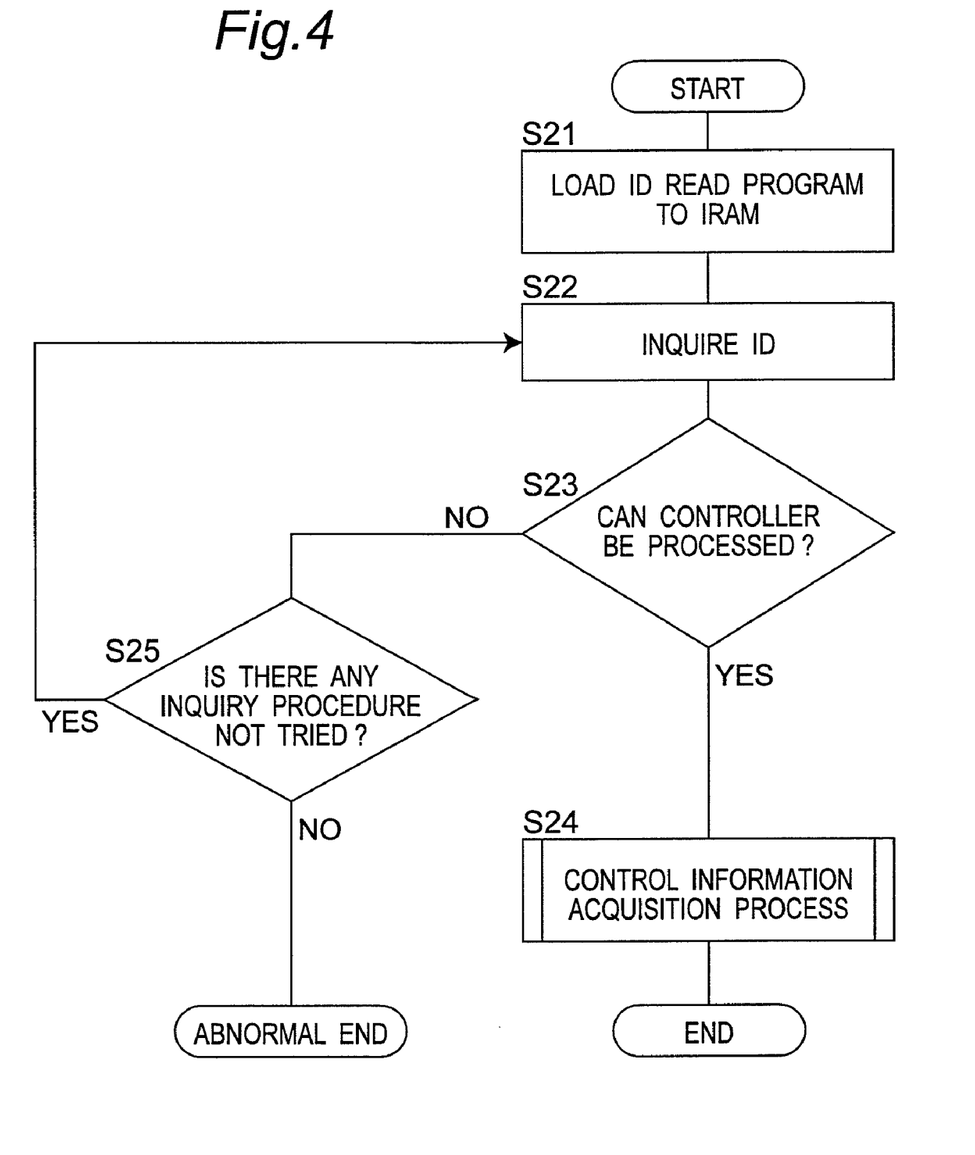
FIG. 4 is a flow chart showing the control information loading operation of the memory card according to a second embodiment of the present invention.

Basically, an operation flow of the memory card having the above-described structure is as shown in FIG. 4. That is, when the memory card 100 is turned ON, the MPU 110 loads the ID read program stored in the ROM 107 into the IRAM 112 (S21). The flash control DSP 111 inquires of the flash memory 104 about the identification information (ID) of the flash memory 104 in accordance with the ID read program stored in the IRAM 112 (S22). The flash memory 104 returns the identification information to the flash control DSP 111. The MPU 110 acquires the identification information of the flash memory 104 via the flash control DSP 111. In accordance with the acquired identification information, the MPU 110 determines whether or not the flash memory 104 connected to a controller 103c is a memory which can be processed by the controller 103c (S23).

When the flash memory 104 is a memory which can be processed by the controller 103c, a control information acquisition process (step S24) is executed. Details of the control information acquisition process of this embodiment will be described with reference to the flow chart of FIG. 8.

Figure 8:
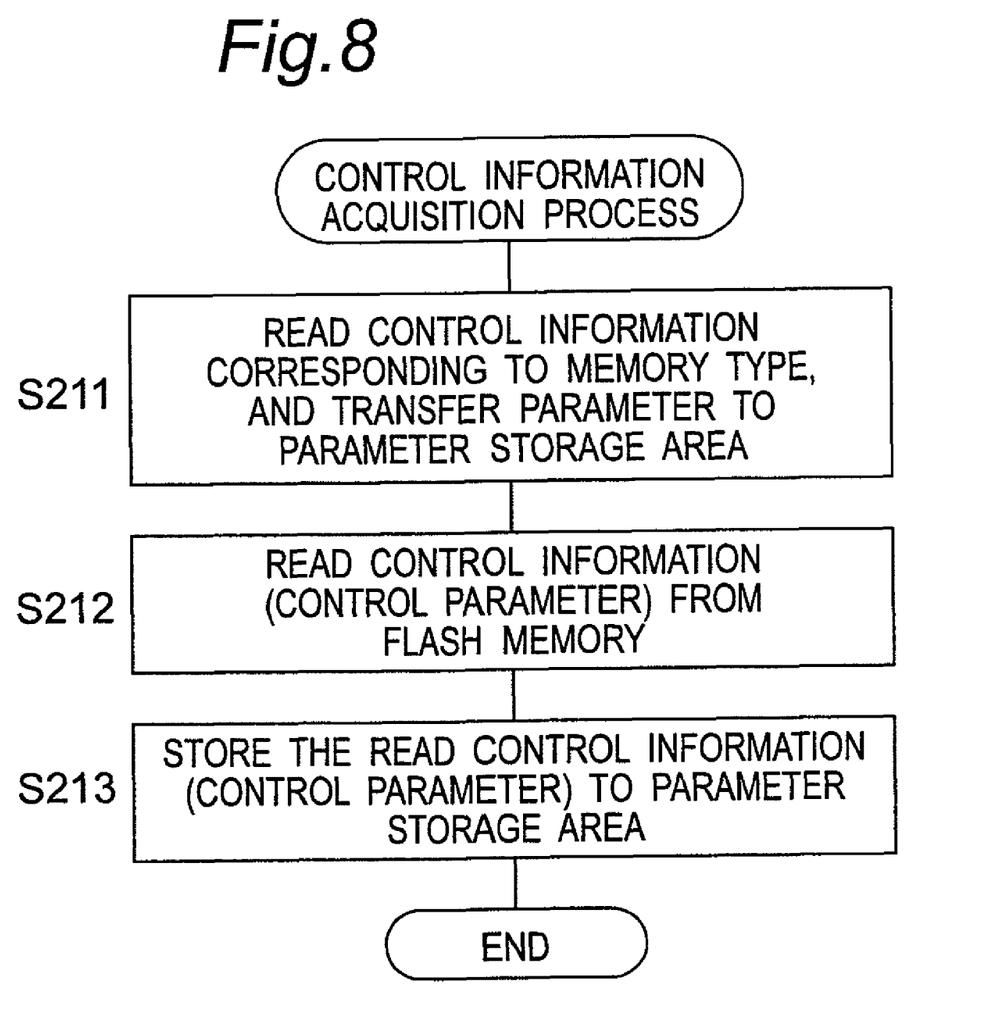
FIG. 8 is a flow chart showing the control information acquisition process for the memory card according to the fourth embodiment of the present invention.

When the flash memory 104 is a memory which can be processed by the controller 103c, the MPU 110 selects the control information read parameter corresponding to the identification information (ID) from a plurality of control information read parameters stored in the RCM 107, and transfers it to a parameter storage area of the IRAM 112 (S211). Next, the flash control DSP 111 executes the control information read program stored in the ROM 121 using the parameter stored in the IRAM 112, so that appropriate reading control corresponding to the flash memory 104 is done and a control parameter is read from the flash memory 104 as the control information (S212). The read control parameter is stored in the parameter storage area of the IRAM 112 (S213). The control parameter thus read has information indicating a characteristic of the flash memory 104. Thus, the flash control DSP 111 by executing the control program using this control parameter can achieve an access corresponding to the specification of the flash memory 104.

Generally a data amount of the parameter is smaller than that of the program. Therefore, as in this embodiment, storing the plural parameters corresponding to the specifications of the flash memories instead of the programs allows a capacity required for the RCM to be reduced.

Although the present invention has been described with the particular embodiments, other many modifications, corrections and other usages are evident to those skilled in the art. Accordingly, the present invention is not restricted to any particular disclosure, but can be limited only by the accompanying claims. The present application is related to Japanese Patent Application No. 2005-083072 filed on Mar. 23, 2005, and contents thereof are incorporated herein by reference.

INDUSTRIAL APPLICABILITY

The present invention is effective for a nonvolatile storage device including a nonvolatile memory and a controller for controlling the nonvolatile memory.

The invention claimed is:

1. A nonvolatile storage device, comprising:
a nonvolatile memory; and
a controller which controls one of writing data to and reading data from the nonvolatile memory, wherein the nonvolatile memory stores:
    identification information which is specific and non-rewritable; and
    control information which is rewritable, which makes the controller control the one of writing data to and reading data from the nonvolatile memory,
the controller comprises:
    a storage that stores plural pieces of control read information which reads the control information from plural types of nonvolatile memories;
    a determiner that reads the identification information from the nonvolatile memory and determines a type of the nonvolatile memory based on the identification information;
    a selector that selects one piece of control read information corresponding to the type of the nonvolatile memory from the plural pieces of control read information; and
    a processor that acquires the control information from the nonvolatile memory based on the one piece of control read information selected by the selector, and controls the one of writing data to and reading data from the nonvolatile memory, and
the one piece of control read information includes information regarding a first function of transferring data in one page of the nonvolatile memory to the controller and a second function of correction with an error-correcting code which is added to data to be written in the nonvolatile memory.

2. The nonvolatile storage device according to claim 1, wherein the identification information includes information about at least one of a capacity of the nonvolatile memory, a manufacturer of the nonvolatile memory, and a memory cell configuration of the nonvolatile memory.

3. The nonvolatile storage device according to claim 1, wherein the one piece of control read information is selected based on data including allocation of the error-correcting code to be written in the nonvolatile memory.

4. The nonvolatile storage device according to claim 1, wherein the one piece of control read information is one of a program and a parameter which controls access to the nonvolatile memory.

5. The nonvolatile storage device according to claim 1, wherein an ability of the second function of correction with the error-correcting code differs depending on the one piece of control read information.

6. The nonvolatile storage device according to claim 1, wherein the determiner includes a plurality of inquiry procedures which reads the identification information and determining the type of the nonvolatile memory.

7. The nonvolatile storage device according to claim 1, wherein
    the determiner further determines whether the controller is configured to control the one of writing data to and reading data from the nonvolatile memory based on the identification information read from the nonvolatile memory, and
    the selector selects the one piece of control read information in response to the determiner determining that the controller is configured to control the one of writing data to and reading data from the nonvolatile memory.

8. A controller which controls one of writing data to and reading data from a nonvolatile memory, wherein
the nonvolatile memory stores:
    identification information which is specific and non-rewritable; and
    control information which is rewritable, which makes the controller control the one of writing data to and reading data from the nonvolatile memory,
the controller comprises:
    a storage that stores plural pieces of control read information which reads the control information from plural types of nonvolatile memories;
    a determiner that reads the identification information from the nonvolatile memory and determines a type of the nonvolatile memory based on the identification information;
    a selector that selects one piece of control read information corresponding to the type of the nonvolatile memory from the plural pieces of control read information; and
    a processor that acquires the control information from the nonvolatile memory based on the one piece of control read information selected by the selector, and controls the one of writing data to and reading data from the nonvolatile memory, and
the one piece of control read information includes information regarding a first function of transferring data in one page of the nonvolatile memory to the controller and a second function of correction with an error-correcting code which is added to data to be written in the nonvolatile memory.

9. The controller according to claim 8, wherein the one piece of control read information is selected based on data including allocation of the error-correcting code to be written in the nonvolatile memory.

10. The controller according to claim 8, wherein an ability of the second function of correction with the error-correcting code differs depending on the one piece of control read information.

11. The controller according to claim 8, wherein the determiner includes a plurality of inquiry procedures which reads the identification information and determining the type of the nonvolatile memory.

12. The controller according to claim 8, wherein
    the determiner further determines whether the controller is configured to control the one of writing data to and reading data from the nonvolatile memory based on the identification information read from the nonvolatile memory, and
    the selector selects the one piece of control read information in response to the determiner determining that the controller is configured to control the one of writing data to and reading data from the nonvolatile memory.

13. A nonvolatile storage system in which a controller controls one of writing data to and reading data from a nonvolatile memory, wherein
the nonvolatile memory stores:
    identification information which is specific and non-rewritable; and
    control information which is rewritable, which makes the controller control the one of writing data to and reading data from the nonvolatile memory,
the controller comprises:
    a storage that stores plural pieces of control read information which reads the control information from plural types of nonvolatile memories;
    a determiner that reads the identification information from the nonvolatile memory and determines a type of the nonvolatile memory based on the identification information;

a selector that selects one piece of control read information corresponding to the type of the nonvolatile memory from the plural pieces of control read information; and a processor that acquires the control information from the nonvolatile memory based on the one piece of control read information selected by the selector, and controls the one of writing data to and reading data from the nonvolatile memory, and the one piece of control read information includes information regarding a first function of transferring data in one page of the nonvolatile memory to the controller and a second function of correction with an error-correcting code which is added to data to be written in the nonvolatile memory.

14. The nonvolatile storage system according to claim 13, wherein the identification information includes information about at least one of a capacity of the nonvolatile memory, a manufacturer of the nonvolatile memory, and a memory cell configuration of the nonvolatile memory.

15. The nonvolatile storage system according to claim 13, wherein the one piece of control read information is selected based on data including allocation of the error-correcting code to be written in the nonvolatile memory.

16. The nonvolatile storage system according to claim 13, wherein the one piece of control read information is one of a program and a parameter which controls access to the nonvolatile memory.

17. The nonvolatile storage system according to claim 13, wherein an ability of the second function of correction with the error-correcting code is different depending on the one piece of control read information.

18. The nonvolatile storage system according to claim 13, wherein the determiner includes a plurality of inquiry procedures which reads the identification information and determining the type of the nonvolatile memory.

19. The nonvolatile storage system according to claim 13, wherein the determiner further determines whether the controller is configured to control the one of writing data to and reading data from the nonvolatile memory based on the identification information read from the nonvolatile memory, and the selector selects the one piece of control read information in response to the determiner determining that the controller is configured to control the one of writing data to and reading data from the nonvolatile memory.

* * * * *

UNITED STATES PATENT AND TRADEMARK OFFICE
CERTIFICATE OF CORRECTION

| | |
|---|---|
| PATENT NO. | : 8,214,714 B2 |
| APPLICATION NO. | : 11/909311 |
| DATED | : July 3, 2012 |
| INVENTOR(S) | : T. Honda |

It is certified that error appears in the above-identified patent and that said Letters Patent is hereby corrected as shown below:

On the Cover Page, References Cited, Foreign Patent Documents, column 2, line 11, "WO 2007044755  5/2004" should be --WO 2004044755  5/2004--.

Signed and Sealed this
Twenty-fifth Day of September, 2012

David J. Kappos
*Director of the United States Patent and Trademark Office*